United States Patent
Brandon et al.

(10) Patent No.: US 7,539,013 B2
(45) Date of Patent: May 26, 2009

(54) AUTOMATIC AIR BLOCKAGE ASSEMBLY AND METHOD FOR COMPUTING ENVIRONMENTS

(75) Inventors: Mark A. Brandon, Poughkeepsie, NY (US); Richard M. Ecker, Poughkeepsie, NY (US); Edward F. Furey, Kingston, NY (US); John J. Loparco, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 11/862,262

(22) Filed: Sep. 27, 2007

(65) Prior Publication Data
US 2009/0086426 A1    Apr. 2, 2009

(51) Int. Cl.
*H05K 7/20* (2006.01)
(52) U.S. Cl. .................. 361/687; 361/690; 361/683; 361/679; 361/727; 312/223.2; 312/223.3; 312/319.1; 454/184

(58) Field of Classification Search ............. 361/679, 361/683, 690–697, 687, 724–728; 454/184, 454/357, 364, 369, 187, 330–332, 342; 312/323, 312/322, 223.2, 223.3, 319.1, 298, 273, 350; 49/28, 139, 234, 345, 334, 340, 382, 445, 49/506; 292/96, 127, DIG. 68; D13/184, D13/163, 162, 110, 199
See application file for complete search history.

(56) References Cited

U.S. PATENT DOCUMENTS

| | | | |
|---|---|---|---|
| 2,944,864 A * | 7/1960 | Krivulka | 312/332.1 |
| 5,425,577 A * | 6/1995 | Gembler | 312/273 |
| 5,460,441 A * | 10/1995 | Hastings et al. | 312/298 |
| 5,877,938 A * | 3/1999 | Hobbs et al. | 361/724 |
| 6,452,809 B1 * | 9/2002 | Jackson et al. | 361/796 |
| 6,699,128 B1 * | 3/2004 | Beadell et al. | 463/46 |
| 6,751,909 B2 * | 6/2004 | Ranaudo | 49/506 |
| 6,985,357 B2 * | 1/2006 | Cauthron | 361/683 |
| 7,031,153 B2 * | 4/2006 | Tanaka et al. | 361/687 |
| 7,236,370 B2 * | 6/2007 | Coglitore et al. | 361/724 |

* cited by examiner

*Primary Examiner*—Michael V Datskovskiy
(74) *Attorney, Agent, or Firm*—Lily Neff

(57) ABSTRACT

A method and incorporated automatic air blockage assembly door is provided. The assembly comprises an air blockage door secured to a frame, capable of moving from a first to a second position via a pivot block and a shaft. The movement of the door is enabled by securing the door via the pivot block to an arm mechanism. The mechanism includes a pivot member and an activation pin. The activation and deactivation of the pin causes the movement of the door.

20 Claims, 7 Drawing Sheets

AUTOMATIC AIR BLOCKAGE ASSEMBLY AND METHOD FOR COMPUTING ENVIRONMENTS

BACKGROUND OF THE INVENTION

1. Field of the Invention

This invention relates to packaging of computing systems and more particularly to packaging of large computing systems that incorporate an air flow to cause air cooling of its components.

2. Description of Background

The industry trend has been to continuously increase the number of electronic components inside computing systems. A computing system can include a simple personal computer, a network of simple computers, or one or even a network of large computers that include one or more central electronic systems (CEC). While increasing the components inside a simple computing system does create some challenges, however, such an increase create many problems in computing systems that include one or more large computers. In such instances many seemingly isolated issues affect one another, especially when packaged together in a single assembly or when networked with or housed in close proximity to other systems.

One such particular challenge when designing computing system packaging is the issue of heat dissipation. Heat dissipation if unresolved, can result in electronic and mechanical failures that will affect overall system performance. As can be easily understood, the heat dissipation increases as the packaging density increases. In larger computing systems, such as the ones that include one or more CECs, the problem of heat dissipation becomes of particular concern.

Heat dissipated from packages residing in large computing systems affect the computing system's internal areas adjacent to heat producing components. However, this is not the only concern with large systems. Due to their large size and the number of heat producing packages, large computing systems can affect the temperature of the environment that they are housed in. Therefore, if several large computing systems are being stored within the same physical confines, improper cooling and unwanted heat dissipation from one or more such systems, can affect all such systems by affecting the temperature of the environment where the computing systems are being stored. The latter has become of special concern as of late and at times cost prohibitive solutions have been suggested in order to keep the environment where the computing systems are being stored in at an acceptable temperature.

Prior art has suggested different ways of dealing with heat dissipation issues. At times, the manner of cooling these components may lead to even further concerns. For example, in instances where air flow is to cool the components inside the environment, including a computer rack or housing, other issues have to be dealt with. One issue is that when an opening (i.e. a door) is in existence, the opening needs to be closed to address air impedance issues. This is especially true in environments where several devices are housed near each other. In such a case, since a variety of devices are placed next to one another, removing one of the devices without closing the opening, would allow air to move freely through the vacated space likely overheating the remaining electronics. When the device is removed, the door closes and approximates the air impedance of an electronic book where the electronics often reside. A closed door also protects the electronics from pollutants and other impurities. In prior art, when air blockage doors have been incorporated, the door or other air blockage component had a design where the opening and closing of such units were cumbersome required system personnel to operate them, thus adding to installation time, cost and procedures. Consequently, a method and incorporated system is needed that can allow for the automated operation of air blockage components such that the environment can be secured from outside pollutants when not in use, and become open to air flow once the operation is resumed.

SUMMARY OF THE INVENTION

The shortcomings of the prior art are overcome and additional advantages are provided through the provision of a method and incorporated automatic air blockage assembly. The assembly comprises an air blockage door secured to a frame, capable of moving from a first to a second position via a pivot block and a shaft. The pivot block is secured to an arm mechanism further having a pivot member and an activation pin. The movement of the door is enabled by the activation and/or deactivation of this pin. In one embodiment, the pin is activated or deactivated when it comes in contact with an electronic book.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

Figure 1:
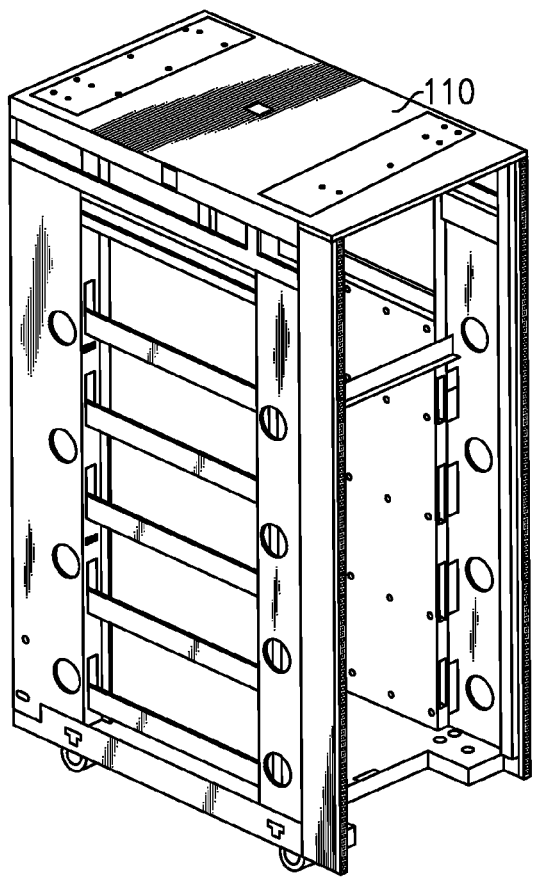
FIG. 1 is an illustration of the frame of a large computer as used in one embodiment of the present invention.

FIG. 1 is an illustration of a computer environment's frame. The frame 110, in this case is depicted to be a rack, but other conventional housing arrangement can be used in conjunction with the workings of the present invention. The frame or rack 110 is designed to house a variety of different components that can range from central electronic complexes (CECs) and mother boards to more specific electronic components. Often these units are grouped together into one or more electronic books which are housed in frames. In large computing environments, the frames often resemble racks as shown in the illustration such that the node/books or other electronic components (boards etc.) can be mounted easily into and out of them using an easy sliding motion.

Figure 2:
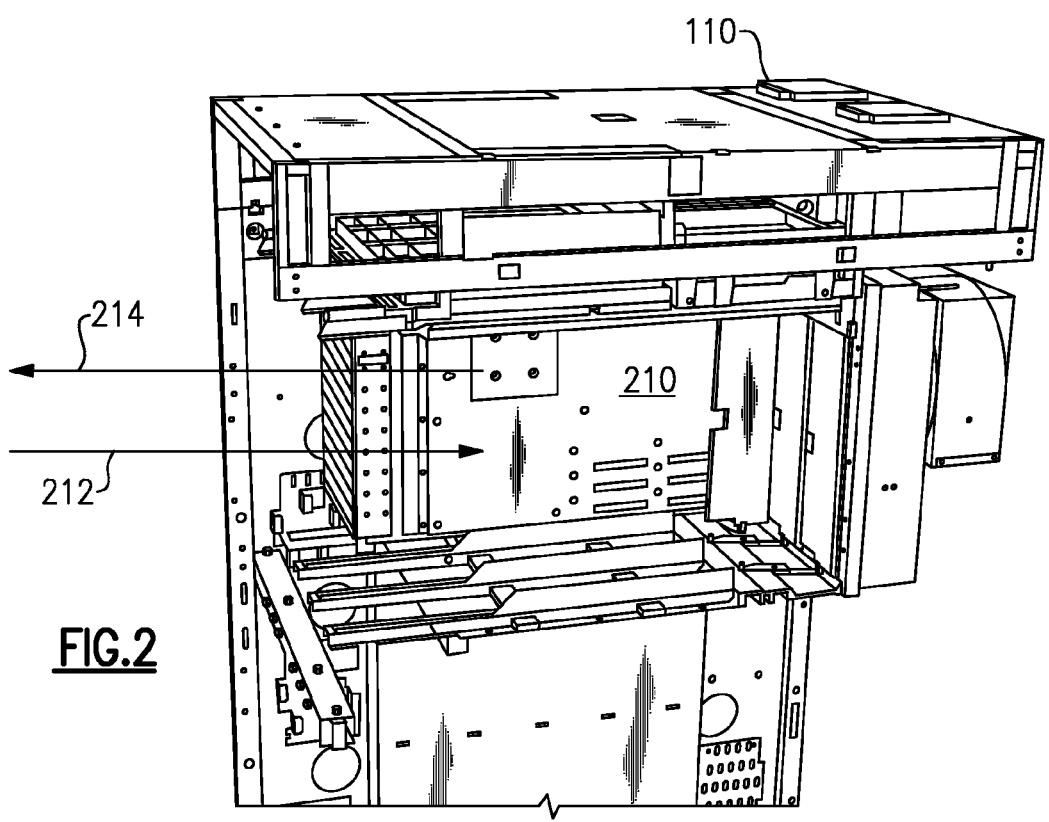
FIG. 2, is an illustration of a plurality of nodes or books as are being inserted or removed onto a frame such as the one provided in the embodiment of FIG. 1.

FIG. 2, is an illustration of a rack 110, such as the one discussed in conjunction with FIG. 1, having at least one book or node referenced as 210. In the embodiment shown, the nodes/books 210 can be moved (i.e. often by sliding motion) into place in the direction of the arrow 212 and removed in the direction of arrow 214, as illustrated in the figure, is shown to be sliding into or out of place. A plurality of nodes or books can be placed side by side on a frame such as the one depicted in FIG. 2.

Referring back to FIG. 1, although the rack 110 was shown as having a cage like structure, such that the depiction in the figure illustrates an open environment, in most instances covers are provided for the racks or housing once installation is completed for a variety of safety and operational reasons. In FIGS. 1 and 2, however, to provide a visual understanding of the environment, these covers have been omitted. In addition, in many instances, it may be necessary to incorporate one or more air blockage doors in the design of the frame once it is fully installed. Again, while such a door is not illustrated in this design, but it may be necessary to incorporate it to provide device safety and integrity.

In general, an optimal air blockage door needs to be closed when there is no device or component (including but not limited to a node, book, board, components or an electronic enclosure) in that position and opened when one is installed. In one embodiment of the present invention, as will be discussed in conjunction with the following figures, the activation of the door will be operated by the installation or removal of the device. As explained earlier, to prevent hot air recirculation as well as or for other reasons, the door needs to be closed in instances where the device is not in operation, but due to heat dissipation concerns, the door needs to be then opened at some point when the device becomes operational again.

In such instances, it may be conceivable to have added a feature to push the door open. As the door opens it would swing out of the way allowing a book, a blower or some other device to occupy the space. The door would be above, below or beside the device when in the open position. When the device is removed the door, which can potentially be spring loaded, could then return to its original closed position. The problem with this approach, however, is that in a confined footprint specifically and more generally in a confined raised floor environment, it may be potentially impossible to allow for components that swing in and out. It may also be difficult in hard to reach placed, for the service personnel to have to manipulate such doors.

Figure 3:
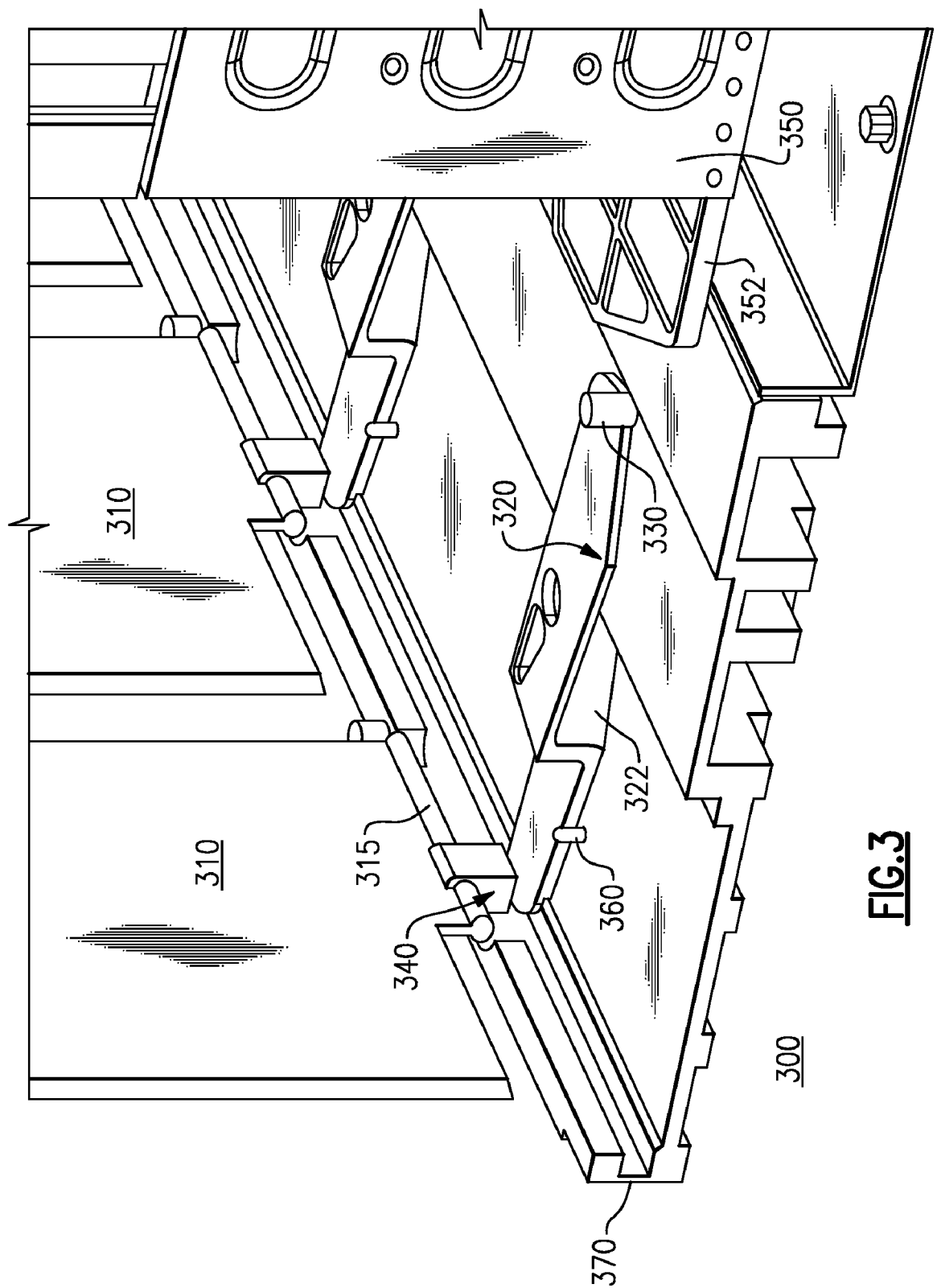
FIG. 3 provides an illustration of an automatic air blockage assembly as per one embodiment of the present invention.

To address, these and to provide better solutions, the present invention instead provides a mechanism that opens automatically and closes automatically upon insertion or removal of components such as the nodes provided in FIG. 2. The invention addresses situations where the door cannot be pushed open since there is a structure behind it that occupies that space. In addition, the design is such that door does not impede any air movement when in the open position and resides in the small open space between books when in the open position (i.e. as shown in FIGS. 3 though 8 below).

It should be noted that the door assembly does not have to be incorporated in a computing environment as will be discussed in the preferred embodiment as will be discussed below. Its incorporation is to ease understanding. The automatic air blockage assembly as will be discussed comprises an air blockage door which can be secured to a frame, such as the computer frame shown earlier in FIGS. 1 and 2. The door is moved or rotated from a first to a second position via a pivot block and a shaft, which can be secured to an arm mechanism. The mechanism includes a pivot member and an activation pin. The activation or deactivation of the pin causes the movement of the door from a first to a second position or vice versa. In one embodiment, the activation and or deactivation process is caused by the removal or engagement of a unit, such as an electronic book or node. A roll stop pin will also be provided for preventing the door to move beyond the first or second position during this activation and deactivation process or at any other time. In one embodiment, the roll stop pin is secured to said frame, at a selective location for this particular purpose.

In order to provide a better understanding of the workings of the present invention, an example should be used to better clarify the process and particular components as discussed generally above. In the following discussion as depicted by the illustrated of FIGS. 3 through 8 below, a preferred embodiment will be used that incorporates the workings of the present invention in a large computing environment, such as the ones provided in FIGS. 1 and 2. It should be noted, however, that the present invention can be applied to a variety of environments and not be limited to instances involving large computing environments. The use of such environments, therefore as presented in the following discussions are only to provide ease of understanding and should not be taken as a limitation of use.

Now referring to the embodiments of FIGS. 3 through 8, the door assembly and its various mechanisms will be explained in more details as pertaining to the preferred embodiment that incorporates them into a computing environment.

FIG. 3 provides an illustration of one embodiment of the present invention. The assembly 300 as shown in FIG. 3, comprises of the computer frame, generally shown as 370. At least one portion of the frame, in this case the area which provides easy removal and insertion of nodes (i.e. as through sliding motion) is secured to at least one side of an air blockage door, referenced here by numerals 310.

In alternate embodiments, it is possible to incorporate a plurality of air blockage doors 350 into the design of assembly which will each be secured to the frame 370 in separate locations. In one scenario, it is possible to incorporate one door for each node/book. In the example of FIG. 3, more than one door is shown to enable a later discussion of a variety of alternate embodiments.

Referring back to FIG. 3, and as illustrated each door 310 is capable to move or rotate from a first to a second position (and alternate positions in between as per some alternate embodiments), via a pivot block 340 and a door shaft 315. The pivot block 340 and the door shaft 315 can be separate entities that are secured to one another and the door, or each or both can be incorporated as part of the door design. In either case, their purpose is to enable the movement (including rotation) of the door from a first to a second position or vice versa. In the embodiments shown in the figures, the first is shown to be a closed position and a second position is shown to be an open position which in this case is a position which is preferably at a 90 degrees angle from the first closed position. In one embodiment, the shaft 315 and the pivot block 340 can be secured to the frame 370 by a variety of ways as known to those skilled in the art.

The nodes/books 350 is intentionally referenced using different numerals as that used in FIG. 2 to reflect the possibility of a more sophisticated design. For example, a cam plate mechanism referenced 352 is incorporated to the book or node 350. The cam plate 352, can be designed and secured later to the node/book 350 or be incorporated as part of it.

The arm mechanism 320 as discussed will include a pivot member (i.e. hereinafter pivot arm) 322 and an activation pin and is secured to the frame 370 and the door at least in one location each though means as known to those skilled in the art. The activation pin, as will be discussed in more details below, is used to move the door shaft 315 which will eventually cause the movement of the door itself.

In a preferred embodiment of the present invention, the pivot arm 322 is spring loaded but other alternate methods as known to those skilled in the art is also conceivable. As will be discussed later, the intent is to allow the book/node to activate the pin 330 which in turn through the arm 322 will move the shaft 315. In addition, as shown, the assembly also comprises a roll stop pin 360 that is secured to the frame 370 at a selective location. Again, a variety of methods can be used to secure these pins to the frame, such a by bolting, screwing, welding or other methods as known to those skilled in the art.

Figure 4:
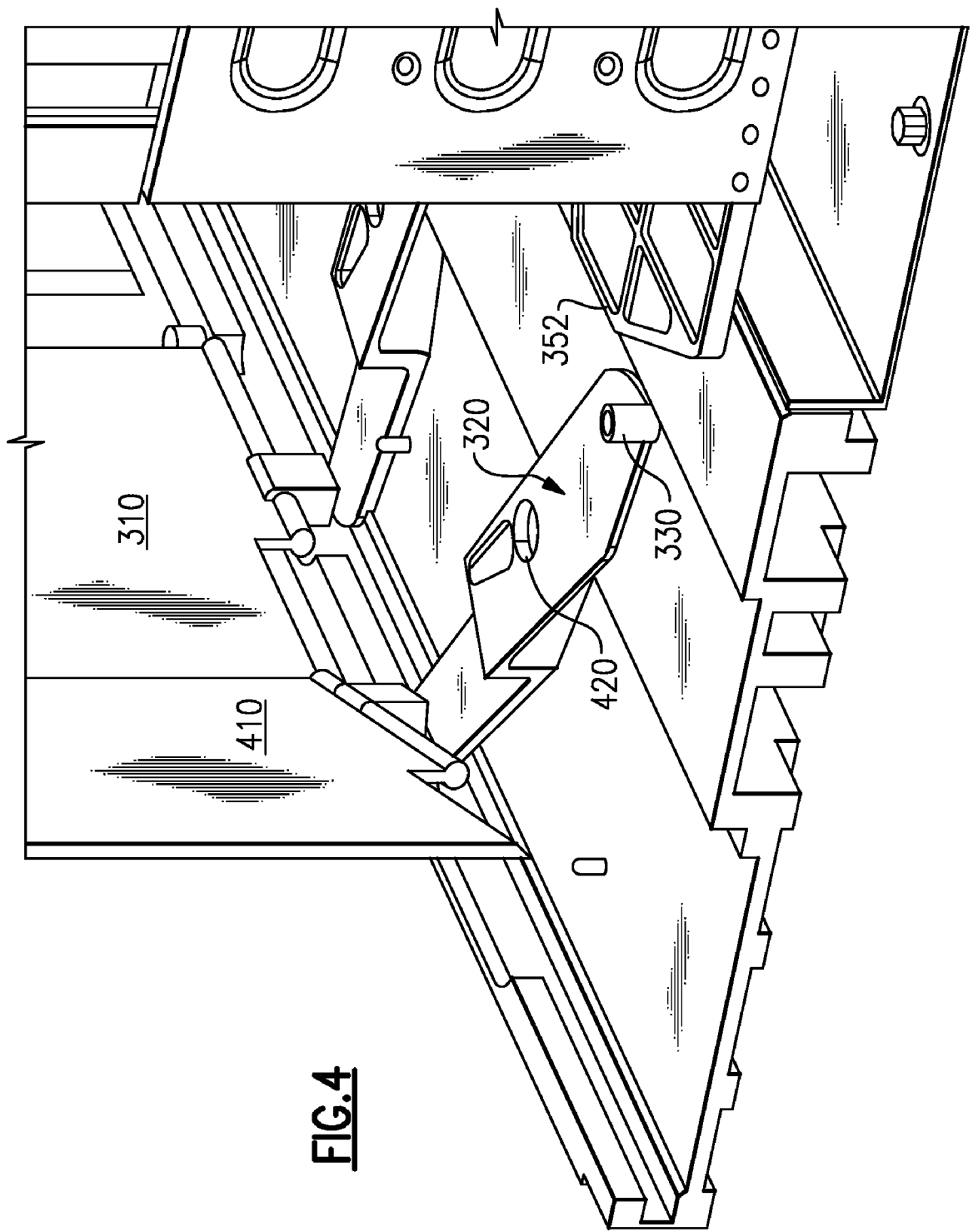
FIG. 4 provides a side view snap shot of the assembly of FIG. 3, while the door is being slowly opened.

In addition, in a preferred embodiment shown in FIGS. 3 and 4, when the cam 352 contacts the activation pin 330 on the pivot arm 320 it rotates around a shoulder screw, or other means known to those skilled in the art. A better view of this is provided in the illustration of FIG. 4. In FIG. 4, the plurality of doors illustrated have been referenced differently as 410 and 310 to differentiate the door while being rotated after an activation process has started (from a closed one). The illustration of FIG. 4 provides a snap shot at a point where the door 410 is just beginning to rotate as the cam 352 contacts the activation pin 330 on the pivot arm 320. The shoulder screw 420, not entirely visible in FIG. 3 is also visible in this figure.

Figure 5:
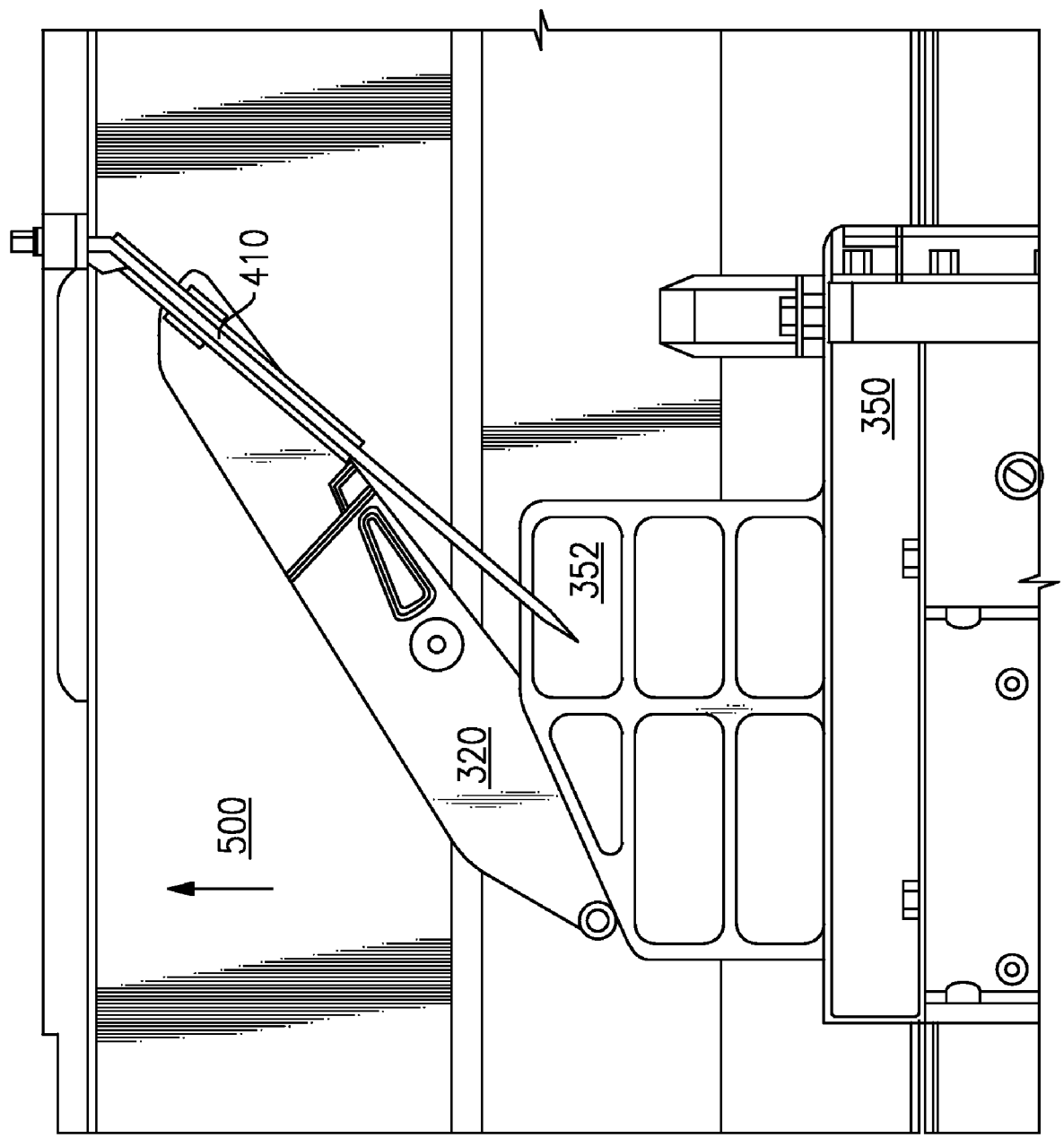
FIG. 5 provides a top down illustration of the embodiment of FIG. 4.
Figure 6:
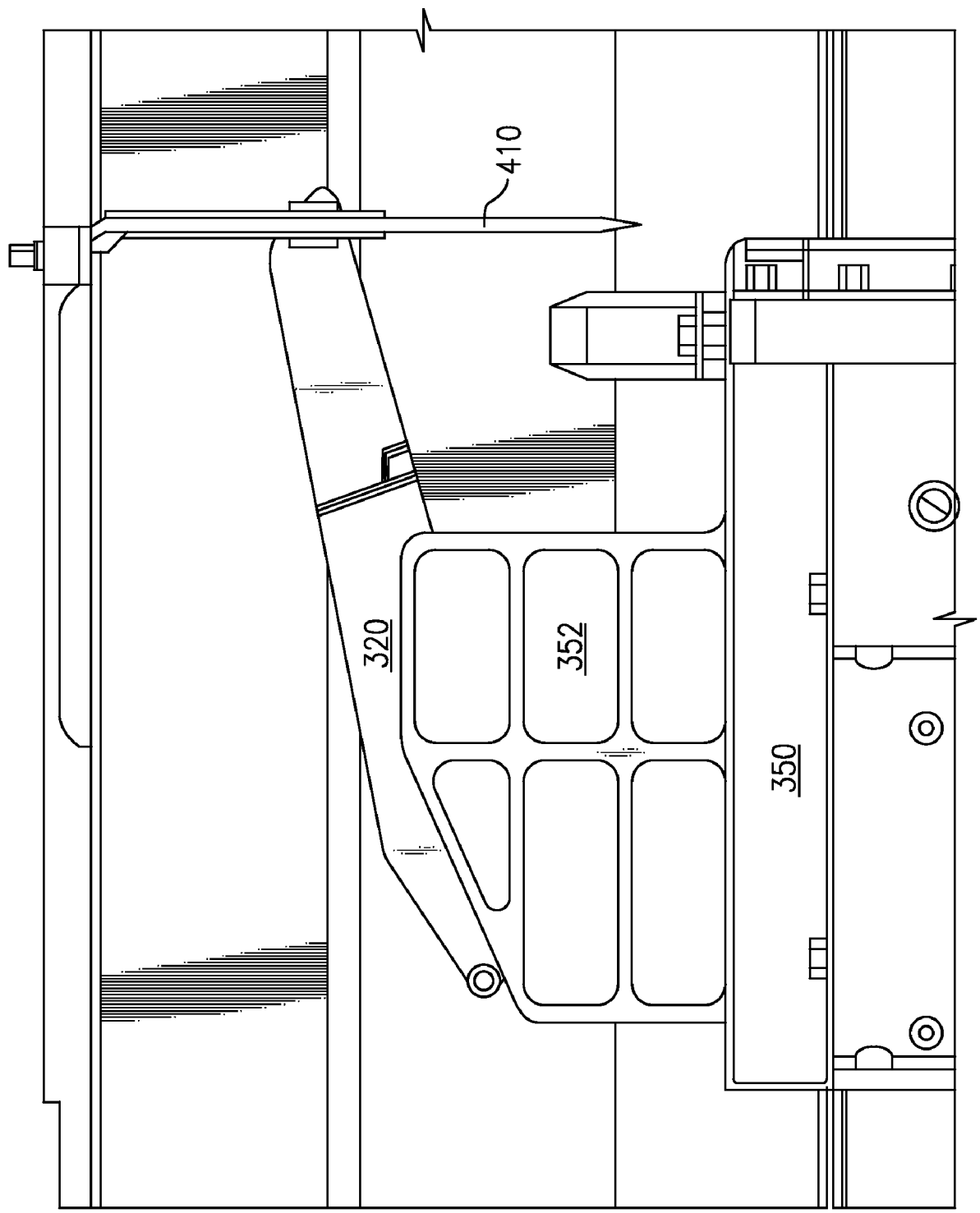
FIG. 6 illustrates the embodiment of FIG. 3, with the air flow door in a completely open position.

Reflecting on FIGS. 3 and 4 together, now a more detailed discussion of the operation of the door can be made. The illustrations show how the door is allowed to be pulled open via the pivot block 340 that is attached to the fixed shaft 315 on the door 410. As the door 410, opens the block moves 340 along the shaft 315. As the node or book 350 is further advanced, the door is opened further as shown in the top down illustration of FIG. 5. As shown in FIG. 5, the door 410 is opening further as the book or node 350 moves forward. The direction of the movement is provided by arrows and referenced by numerals 500 as shown in the figure.

The door is opened until it eventually reaches a 90 degrees angle, at which time the book is allowed to move past it. This concept is provided by the illustration of FIG. 6. As can be seen, in FIG. 6, the door 410 is completely open, but without taking any much needed space. Looking at FIG. 3 3 and 6 together, in this position (the position shown) the book/node 350 can now travel past the door 410, including the activation pin on the pivot arm 330 until it reaches the roll pin stop 360.

In one embodiment, the purpose of having the roll pin stop 360 is to help position the activation pin in relation to the cam plate so that it is always hits at the same position. In other embodiments, however, it is conceivable to have the pin 360 also act as a means to help restrict the travel of the device and to prevent the movement of the door beyond the intended positions (i.e. the 90 degree, open and closed positions). In other embodiments, it is conceivable to use this pin in conjunction with the activation pin 330 to signal engagement and/or disengagement of the books/nodes.

Figure 7:
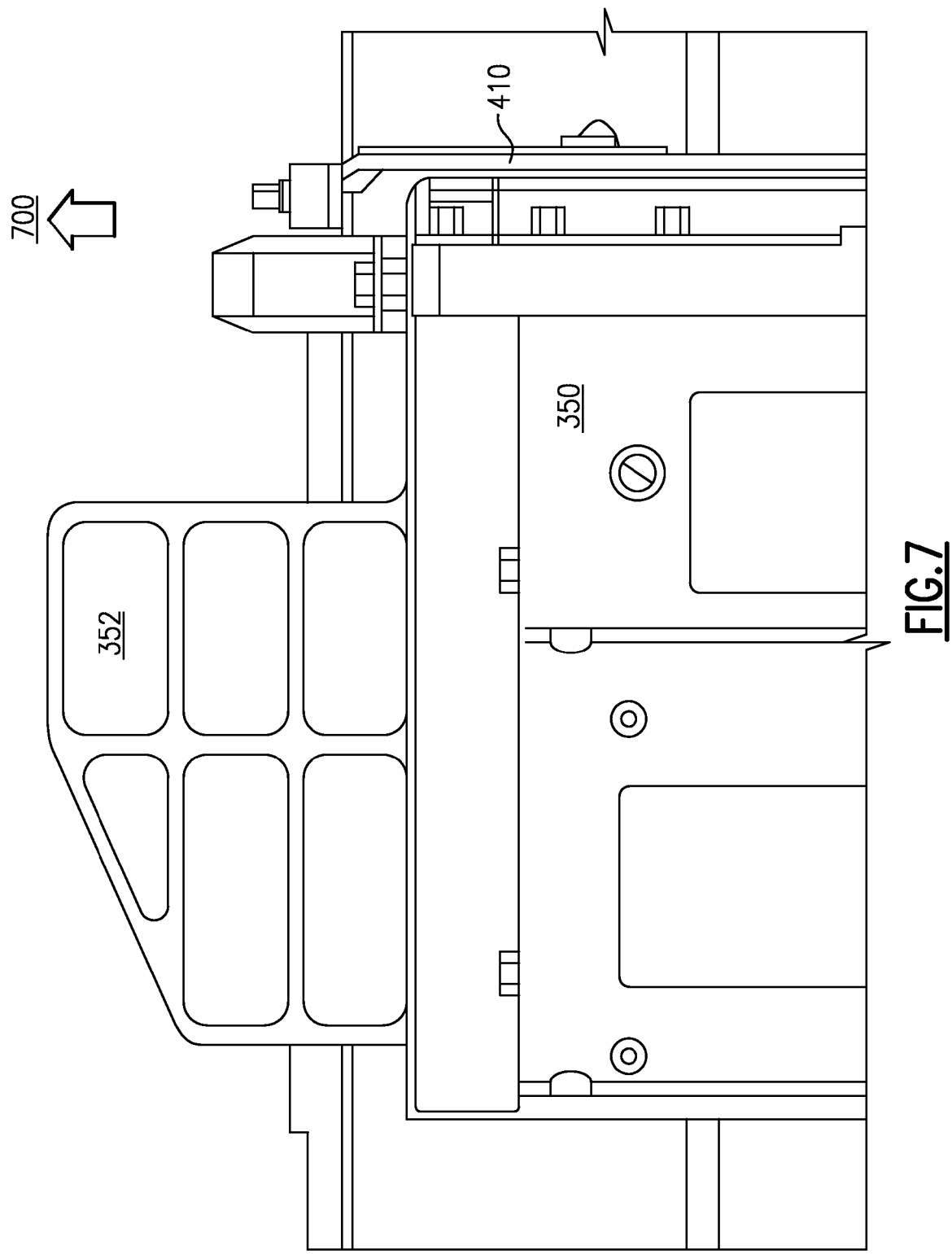
FIG. 7 provides a top down illustration of the assembly of the embodiment of FIG. 3 once the book/node is fully engaged and the activation pin is activated.

FIG. 7 provides an illustration of the completed process. As can be seen in the top down presentation of FIG. 7, the book/node 350 is now completely engaged and the door 410 which is completely open, resides in the space between doors to allow maximum air flow. It should be noted that while the door(s) occupying very little footprint space (which is left mostly unused anyway), they do provide a benefit in designs where a plurality of doors are being used simultaneously and multiple books/nodes are being engaged at the same time. In these embodiments, the actual doors when in open position, physically separate the books/nodes from one another and provide further rigidity and other benefits to the structured assembly. This design allows maximum use of the footprint without any element of the door having to take up additional room (to spring out, in or around) such that it causes issues in a tight environment.

In FIG. 7, as per example, the direction of air flow for this particular embodiment is also shown as referenced by arrows and numerals 700. This, however, is only provided for ease of understanding and in other embodiments, the air flow direction may be differently positioned selectively.

Figure 8:
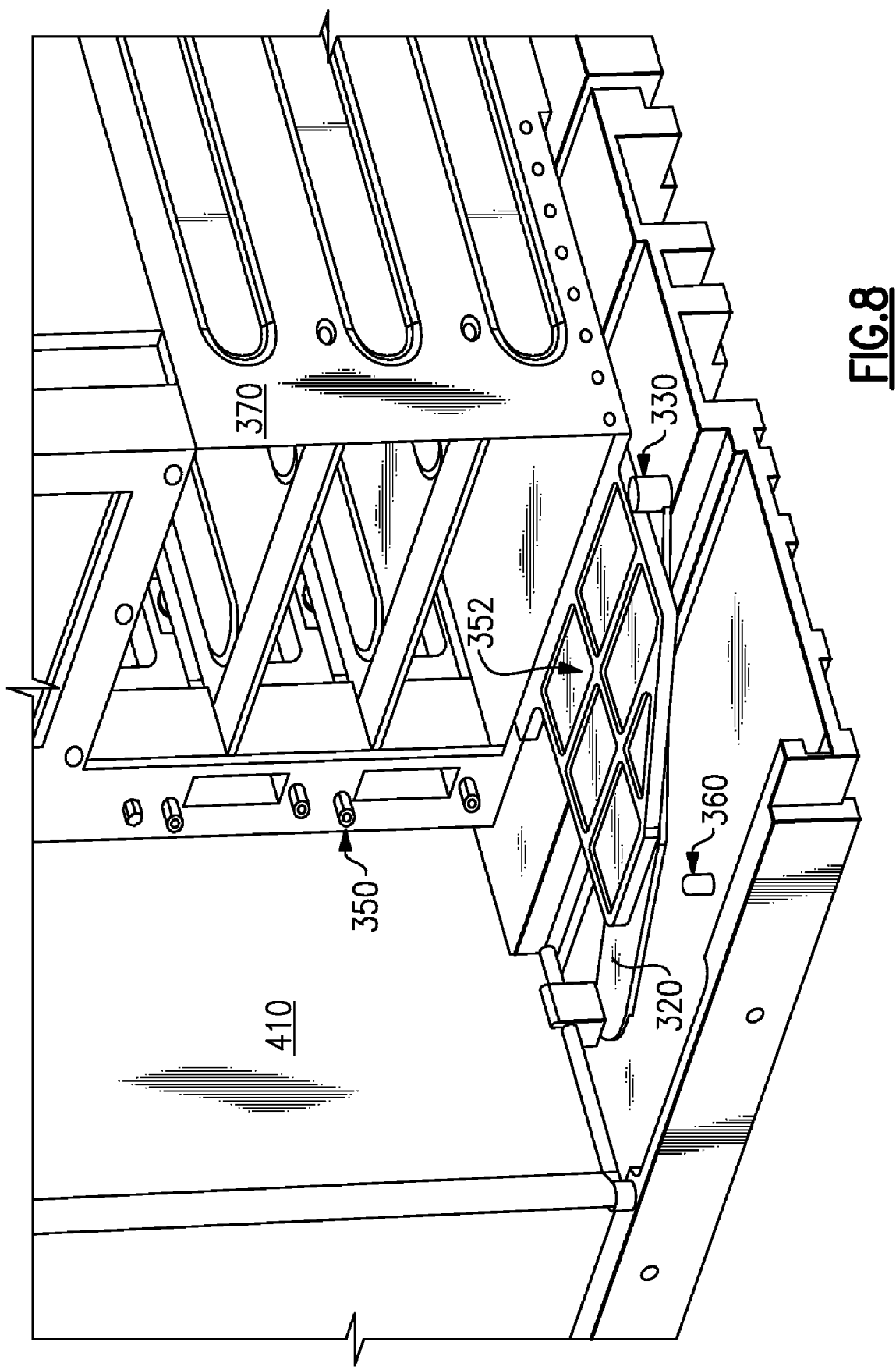
FIG. 8 illustrates the embodiment of FIG. 3 while the node/book is being disengaged causing the deactivation of the pin.

FIG. 8 is an illustration of the assembly just before the process is being reversed. FIG. 8 can be reviewed in conjunction with FIG. 3 to understand the process as the book/node 350 is being removed. As the process is reversed, the door 410/310 moves away from the rear of the assembly as shown in FIG. 8. It should be noted that the door 410 is still being held open at this point by the book/node 350 as illustrated in FIG. 8. The actuation pin 330 is still in contact with the cam 352 at this point. As the book/node 350 continues its movement backward, however, the pin 330 will be deactivated. In this embodiment, the pin 330 will follow the cam 352 and the spring loaded pivot arm will return to its original position against the pin stop. In other words, removing the book/node 350 then allows the spring loaded door to return to its closed position.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. An automatic air blockage assembly, comprising:
    an air blockage door secured to a frame, capable of moving from a first to a second position via a pivot block secured to a shaft;
    said shaft being secured to the bottom of said door and said pivot block being secured at one side to said pivot block;
    an arm mechanism having a pivot member and an activation pin secured to said door via said pivot block such that when said pin is activated, said mechanism causes said door to go from a first to a second position and when said pin is deactivated; said door returns to said first position;
    a roll stop pin secured to said frame at a selective location to later guide engagement of electronic books after activation of said pin.

2. An automatic air blockage assembly for a computer, comprising:
    an air blockage door having a shaft secured to a pivot block;
    an arm mechanism having a pivot member and an activation pin secured to door via said shaft such that said mechanism can move said door when said pin is activated or deactivated.

3. The assembly of claim 2, wherein said activation pin is activated when an electronic book contacts said pin in a direction moving towards said door and is deactivated when said book contacts said pin in a direction away from said door.

4. The assembly of claim 2, further comprising a roll stop pin secured to said frame at a selective position, such that said roll stop pin guides the movement of said book once said pin is deactivated.

5. The assembly of claim 4, wherein said book includes a cam plate which when contacts said pin causes said activation and deactivation of said pin.

6. The assembly of claim 4, wherein said arm mechanism further includes a shoulder screw, around which said pivot arm can rotate;

said arm mechanism and said screw being further secured to said frame.

7. The assembly of claim 6, wherein said pivot block is secured to said frame.

8. The assembly of claim 7, wherein said pivot block moves said door via said door shaft.

9. The assembly of claim 8, wherein said activation pin is located on said pivot arm.

10. The assembly of claim 8, wherein said pivot arm is spring loaded.

11. A method for automatically blocking and unblocking air flow to a unit, comprising:

providing a rotating air blockage door by securing a door to a frame of said unit via a door shaft and an a pivot block; and securing said pivot block to an arm mechanism having a pivot member with an activation pin such that said door can be opened or closed by activated or deactivating said pin.

12. The method of claim 11, further comprising securing a roll stop pin it to said frame at a selective location such that said pin guides an electronic book once said pin is activated and deactivated.

13. The method of claim 11, wherein said door is used to provide air flow to a computer unit.

14. The method of claim 13 wherein said frame is a computer rack.

15. The method of claim 13, wherein said open position allows the door to rotate inside said frame at a ninety degree angle.

16. The method of claim 15, wherein a number of automatic doors are used in conjunction with one another.

17. The method of claim 11, wherein said activation pin is activated when a node is moved towards said door and is deactivated when said node is moved in a direction away from said door.

18. The method of claim 15, wherein said node includes a cam plate which activates and deactivates said pin once it comes in contact with it; said cam plate also engaging and deengaging said stop pin.

19. The method of claim 16, wherein said arm mechanism is secured to said frame and said arm further includes a shoulder screw, around which said pivot arm can rotate and said shoulder screw is secured to said frame.

20. The method of claim 17, wherein said pivot arm is spring loaded.

* * * * *